(12) United States Patent
McDowell et al.

(10) Patent No.: US 8,243,340 B2
(45) Date of Patent: Aug. 14, 2012

(54) PRE-PROCESSING OF IMAGE DATA FOR ENHANCED COMPRESSION

(75) Inventors: Brian C. McDowell, Woodinville, WA (US); Nadim Y. Abdo, Bellevue, WA (US); Paul Lee Coleman, IV, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 938 days.

(21) Appl. No.: 11/469,406

(22) Filed: Aug. 31, 2006

(65) Prior Publication Data

US 2007/0195369 A1    Aug. 23, 2007

Related U.S. Application Data

(60) Provisional application No. 60/776,648, filed on Feb. 23, 2006.

(51) Int. Cl.
*H04N 1/413* (2006.01)
(52) U.S. Cl. ............... 358/426.13; 358/426.14; 382/166
(58) Field of Classification Search ............ 358/426.13–426.14; 382/166
See application file for complete search history.

(56) References Cited

U.S. PATENT DOCUMENTS

| | | | | |
|---|---|---|---|---|
| 4,716,453 A | * | 12/1987 | Pawelski | 375/240.01 |
| 5,260,783 A | * | 11/1993 | Dixit | 375/240.13 |
| 5,359,694 A | | 10/1994 | Concordel | |
| 5,363,098 A | | 11/1994 | Antoshenkov | 341/95 |
| 5,519,794 A | | 5/1996 | Sandor et al. | |
| 5,666,137 A | | 9/1997 | Coelho et al. | |
| 5,907,297 A | | 5/1999 | Cohen et al. | 341/95 |
| 5,940,080 A | | 8/1999 | Ruehle et al. | 345/432 |
| 6,353,440 B1 | | 3/2002 | Keene | |
| 6,445,870 B1 | | 9/2002 | Abe | |
| 6,453,072 B1 | | 9/2002 | Hatakenaka | |
| 6,476,811 B1 | | 11/2002 | DeRoo et al. | 345/427 |
| 6,591,019 B1 | | 7/2003 | Comair et al. | 382/248 |

(Continued)

FOREIGN PATENT DOCUMENTS

CN        1405735 A        3/2003

(Continued)

OTHER PUBLICATIONS

Nieh et al., "*A Comparison of Thin-Client Computing Architectures*," Network Computing Laboratory, Columbia University, Nov. 2000, available at http://www.ncl.cs.columbia.edu/publications/cucs-022-00.pdf (PDF enclosed entitled "Article 1," 16 pgs.).

(Continued)

*Primary Examiner* — Benny Tieu
*Assistant Examiner* — Martin Mushambo
(74) *Attorney, Agent, or Firm* — Merchant & Gould P.C.

(57) ABSTRACT

Embodiments herein provide for a pre-processing stage or mechanism for enhancing data compression of an image by splitting or separating the color channels for pixels into planar data sources. Typically, image data is displayed as an interleaved set of channel types for a color space such that each pixel within an image (such as a bitmap) has one component for each color channel. By separating the interleaved bitmap into a planar representation, each plane can be compressed independently and often times achieve higher compression ratios. This is especially true for channels that are expected to stay fairly constant throughout the bitmap most of the time. The utilization of the above embodiment can be further enhanced through manipulation of channel data or through converting the color space from one form to another.

12 Claims, 3 Drawing Sheets

U.S. PATENT DOCUMENTS

| | | | |
|---|---|---|---|
| 6,721,455 B1* | 4/2004 | Gourdol | 382/232 |
| 6,831,575 B2 | 12/2004 | Wu et al. | 341/50 |
| 6,941,023 B2 | 9/2005 | Shiraishi | 382/245 |
| 6,970,504 B1 | 11/2005 | Kranawetter et al. | |
| 2002/0061063 A1* | 5/2002 | Otto | 375/240.03 |
| 2002/0101536 A1 | 8/2002 | Cook et al. | |
| 2002/0196848 A1* | 12/2002 | Roman | 375/240.08 |
| 2003/0151610 A1* | 8/2003 | Kuriakin et al. | 345/589 |
| 2003/0219161 A1* | 11/2003 | Yokose | 382/239 |
| 2004/0090351 A1 | 5/2004 | Wu et al. | 341/50 |
| 2004/0126031 A1* | 7/2004 | Dwyer et al. | 382/251 |
| 2005/0168487 A1 | 8/2005 | Wilt et al. | 345/643 |
| 2005/0286775 A1 | 12/2005 | Jeffrey et al. | |
| 2007/0242890 A1* | 10/2007 | Wen et al. | 382/233 |

FOREIGN PATENT DOCUMENTS

| | | | |
|---|---|---|---|
| EP | 0510933 A1 | 10/1992 | |
| GB | 2353452 | 2/2001 | |
| RU | 2190309 C2 | 9/2002 | |
| RU | 2195694 C2 | 12/2002 | |
| WO | 9314600 A1 | 7/1993 | |
| WO | 9960793 A1 | 11/1999 | |

OTHER PUBLICATIONS

Jeffrey Michael Gilbert, "*Text/Graphics and Image Transmission over Bandlimited Lossy Links*," University of California, Berkeley, Spring 2000, available at http://www1.cs.columbia.edu/~ricardo/misc/papers/T-G-I%20Transmission%20over%20lossy%20bandlimited%20links%20-%20Thesis.pdf (PDF enclosed entitled "Article 2," 276 pgs.).

"International Search Report", Mailed Date Jul. 16, 2007, Application No. PCT/US2007/001097, Filed Date Jan. 16, 2007, pp. 8.

Chinese 1st Office Action in Application 200780006315.5, mailed Jun. 2, 2010, 21 pgs.

Chinese 2nd Office Action in Application 200780006315.5, mailed Dec. 23, 2011, 10 pgs.

European Extended Search Report in Application 07716661.9, mailed Nov. 3, 2011, 12 pgs.

Thomas Porter & Tom Duff, "Compositing Digital Image", SIGGRAPH 84—Computer Graphics, vol. 18, No. 3, Jul. 1984, 7 pgs.

Russian Decision on Grant in Application 2008134468, mailed Apr. 20, 2011, 5 pgs.

\* cited by examiner

PRE-PROCESSING OF IMAGE DATA FOR ENHANCED COMPRESSION

CROSS-REFERENCE TO RELATED APPLICATIONS

This application claims priority to U.S. Provisional Application No. 60/776,648 entitled the same and filed Feb. 23, 2006, which is incorporated herein by reference in its entirety.

BACKGROUND

Although computers were once isolated and had minimal or little interaction with other computers, today's computers interact with a wide variety of other computers through Local Area Networks (LANs), Wide Area Networks (WANs), dial-up connections, and so forth. With the wide-spread growth of the Internet, connectivity between computers is becoming more important and has opened up many new applications and technologies. The growth of large-scale networks, and the wide-spread availability of low-cost personal computers, has fundamentally changed the way that many people work, interact, communicate, and play.

One increasing popular form of networking may generally be referred to as virtual computing systems, which can use protocols such as Remote Desktop Protocol (RDP), Independent Computing Architecture (ICA), and others to share a desktop and other applications with a remote client. Such computing systems typically transmit the keyboard presses and mouse clicks or selections from the client to a server, relaying the screen updates back in the other direction over a network connection (e.g., the Internet). As such, the user has the experience as if their machine is operating as part of a LAN, when in reality the client device is only sent screenshots of the applications as they appear on the server side.

Because bitmaps are expensive in terms of bandwidth consumption when transmitted over a network connection (e.g., Internet), rather than sending the entire bitmaps most virtual systems nowadays send graphic primitives and other operations, which tell a sub-routine on the client side what and how to draw something. For example, a client may be told to draw a rectangle along with information about where it should be drawn, what size, color, etc. For instance, a rectangle may be used to draw a button for a user interface, a border around a document, or any other purpose for which a rectangular shape may be useful. Of course, there are many other shapes and operations that can be used as primitives that may be more sophisticated and require more processing that must be done to transfer and perform the operation on the remote client.

As applications continue to get more sophisticated graphical user interfaces, the more processing intensive the use of the above primitives becomes. For example, bitmap images have been expanded to include an Alpha channel, which essentially indicates a desired level of transparency associated with each pixel. This transparency level instructs the client how to blend each pixel of the bitmap with the color that was already present where the bitmap is being displayed. An even better example of the expense associated with processing sophisticated primitive updates may be animation objects or elements, where a sequence of commands must instruct the client on how to draw the animation at each stage of the animation. When sequences of primitives are too complex, it may sometimes make more sense to send a bitmap representation that can more simply be displayed, rather than the potentially long sequence of other more complicated primitive operations. As previously mentioned, however, it may be too expensive to continually send full bitmap representations of the screen because of the limitations of most bit stream compressors together with limited network bandwidth.

BRIEF SUMMARY

The above-identified deficiencies and drawback of current bitmap compression mechanisms are overcome through example embodiments of the present invention. For example, embodiments described herein provide for a pre-processing mechanism of image data in order to organize the channel components in such a way that a general compressor can more readily recognize data patterns; and therefore achieve better compression ratios. Note that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example embodiment provides for pre-processing of image data for enhanced data compression by exposing common pattern(s) in the image data that are typically unrecognizable by a bit stream processor when the image data is displayed in color channel interleaved form. In such embodiment, a digital image represented as a plurality of pixels is received. Each pixel is defined by a color space including color channels that are typically displayed such that the layout of the plurality of pixels appears as an interleaved sequence of the color channels. Next, it is determined if the digital image is separated into planar data sources, each of which includes digital image data for each of the individual color channels such that redundancy or another recognizable sequence of digital image data can be readily identified by one or more data compression modules that are pattern and/or statistics based. Further, based upon the above determination, the planar data sources are sent to the compression module(s) in order to assist them to more efficiently compress the digital image than when the digital image is in its interleaved form.

Another embodiment provides a mechanism for decompressing digital image data that was encoded as separate color channels of a color space in order to improve data compression. In this embodiment, a first set of compressed digital image data representing one of a planar data sources is received, wherein each of the planar data sources corresponds to a color channel of a color space for a plurality of pixels of a digital image. Note that each of the planar data sources were exposed as separate digital image data such that redundancy or any other recognizable sequence of digital image data could be readily identified by data compression module(s) that are pattern and/or statistics based. Thereafter, a second set of compressed digital image data representing another of the planar data sources is received. Accordingly, the first and second sets of compressed digital image data are decompressed into their respective planar data sources. In such instance, the digital image can be displayed as an interleaved sequence of the decompressed color channels such that each pixel of the digital image includes a color component corresponding to each of the planar data sources.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantageous features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
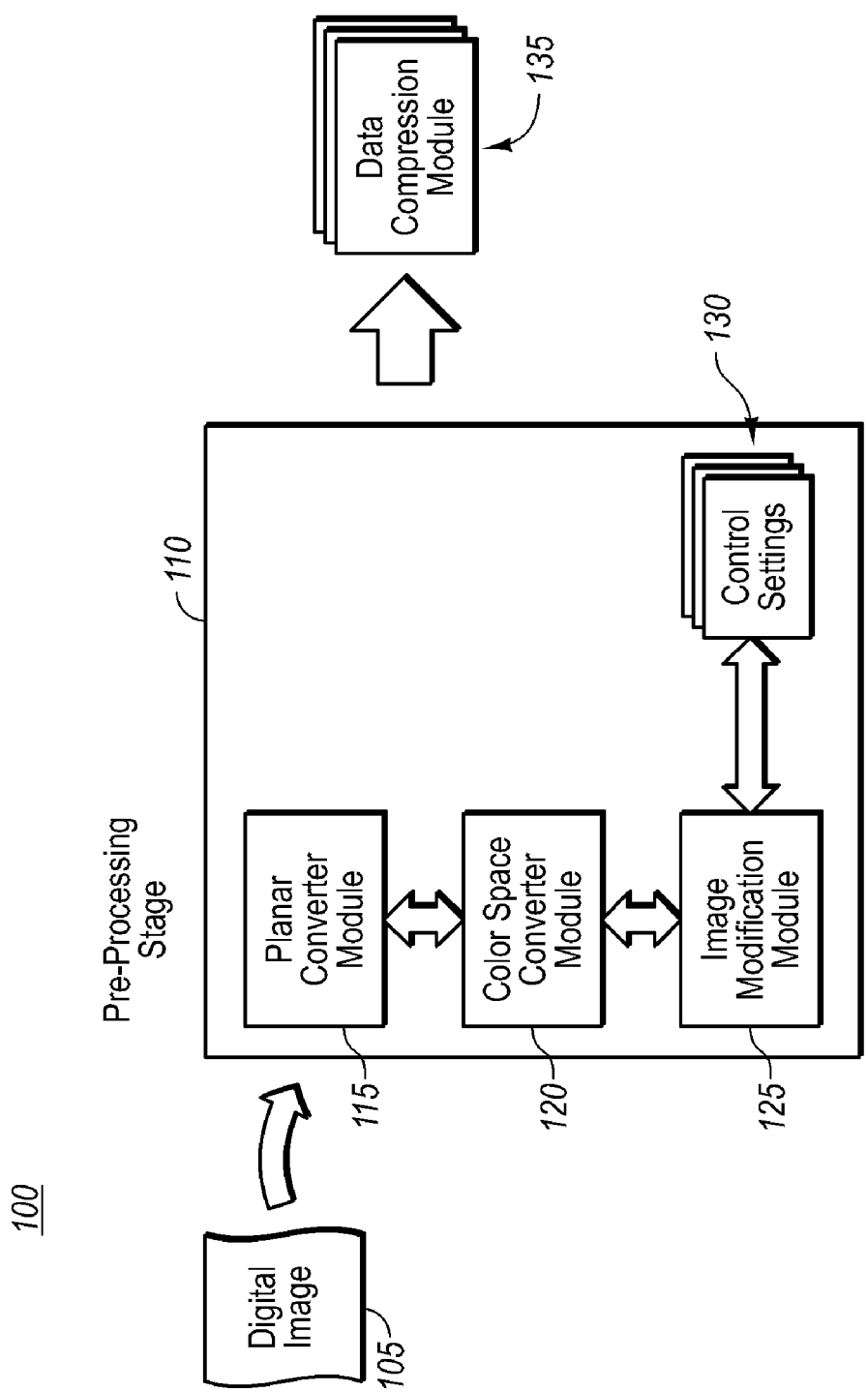
FIG. 1 illustrates a pre-processing stage for assisting in the compression of a digital image in accordance with example embodiments.

The present invention extends to methods, systems, and computer program products for separating or splitting color channels of a color space into respective planar representations in order to expose patterns and other sequences to enhance compression ratios. The embodiments of the present invention may comprise a special purpose or general-purpose computer including various computer hardware or modules, as discussed in greater detail below.

Embodiments herein provide for a pre-processing stage or mechanism for enhancing data compression of an image by splitting or separating the color channels for pixels into planar data sources. Typically, image data is displayed as an interleaved set of channel types for a color space such that each pixel within an image (such as a bitmap) has one component for each color channel. For example, a pixel that has the color space of red, green and blue (RGB) will have one color channel for red, one channel for green, and one channel for blue. Accordingly, exemplary embodiments separate the components for each channel into planar data sources such that like components are shown within the same plane. By separating the interleaved bitmap or digital image into a planar representation each plane can be compressed independently and often times achieve higher compression ratios. This is especially true for channels that are expected to stay fairly constant throughout the bitmap most of the time (e.g., an Alpha channel that describes the transparency of elements within a bitmap).

In other words, exemplary embodiments take advantage of the fact that often times one channel can be going through transitions while others are held fairly constant. The utilization of the above embodiment can be further enhanced through manipulation of channel data or through converting the color space to something other than just RGB. For example, other color spaces that define a pixel in terms of illumination and chrominance (e.g., YUV, YCoCg, etc.) typically describe a color space more in terms of how a human eye perceives colors. In other words, these types of color spaces separate color components that an eye is more sensitive to from those channels that the eye is less sensitive. Accordingly, by taking advantage of the perceptual differences of human eyes, it is possible to degrade the information within a color channel to enhance patterns that compression models can more efficiently handle, yet allowing the image to remain perceptually lossless.

As described herein, there may be several ways of allowing color information for a particular color space or digital image to be modified in order to enhance compression ratios. For example, the chrominance channels of a particular color scheme may be quantized by reducing the overall bit count associated with the particular channel, thereby reducing the fidelity of the color palette but not necessarily the range of the color scheme. Alternatively, or in conjunction, a sample pixel space or sub-sampling of various chrominance values can be modified to some average of the overall values, and or other similar modifications to bring the values to a common denominator. Of course, as will be described in greater deal below, there may be other mechanisms for modifying data to enhance pattern recognition when pre-processing image data for compression.

Once the digital image or bitmap has been split into logically separate digital images, i.e., one for each plane of channel info, and once all manipulation or modification of the data has been made, exemplary embodiments can encode the values using standard or well known encoding modules such as a two-dimensional run length encoding scheme. Each scan line of the bitmap may be treated as a difference from the scan line that precedes it and then those differences can be encoded as described in greater detail below.

Although more specific reference to advantageous features are described in greater detail below with regards to the Figures, embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

FIG. 1 illustrates a digital image computing device 100 configured to pre-process a digital image or bitmap for compression in accordance with example embodiments. (Note that the following detailed description will occasionally reference modules and other items shown in FIG. 1 when describing other Figures and embodiments herein.) As shown, a digital image 105 can be received by the pre-processing stage 110. Note that the digital image 105 may be any type of image such as a document of text, a portion or entire user interface, a graphical picture as in a video, or any other similar type graphics. Accordingly, the term digital image 105 or bitmap (as used interchangeably herein) should be broadly construed to include any type of graphical information.

Figure 2C:
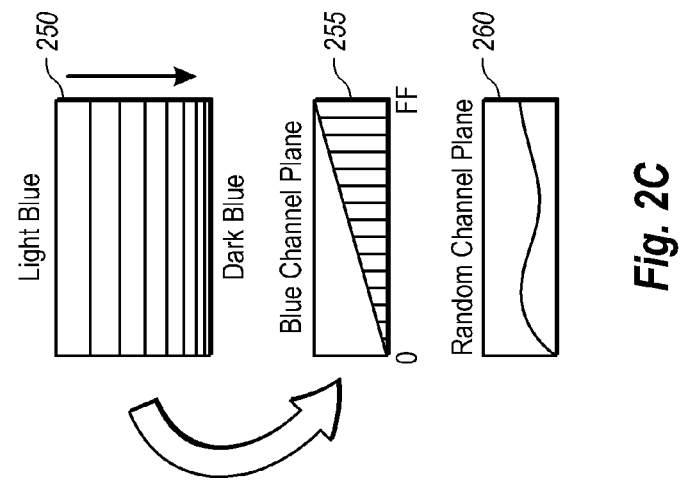
FIG. 2C illustrates the use of planar data sources for exposing patterns and mathematical functions of color channels in accordance with example embodiments.
Figure 2A:
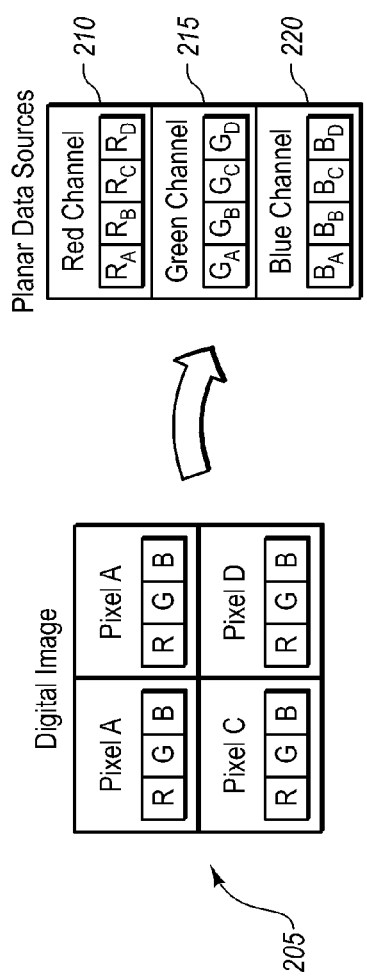
FIG. 2A illustrates the separation of a digital image into planar data sources for enhancing compression ratios in accordance with example embodiments.

Regardless of the type of digital image 105, the bitmap 105 is typically displayed and processed in color channel interleaved form. For example, as shown in FIG. 2A, a digital image 205 may have various pixels (e.g., pixel A-D) each with color components for color channels of a particular color space (e.g., in this example RGB). As shown, each pixel is interleaved with a color channel for each color component of red, green, and blue. Note that such interleaved fashion of this color space, as well as other color spaces, can lead to non-optimal compression. For example, if a digital image 205 had all blue background, then the blue channel component of each pixel within the digital image 205 may be fully or partially illuminated, while the red and green channels would have no illumination. Nevertheless, most data compression modules 135 typically would not recognize such pattern resulting in insufficient compression. More specifically, such encoders like a run length encoder may only identify the red and the green components within a single pixel as suitable for compression, but still leaving the value of each blue component uncompressed.

In order to overcome such inefficiencies, example embodiments provide for pre-processing stage 110 that can expose common pattern(s) in the image data that are typically unrecognizable by a bit stream processor when the image is displayed in color channel interleaved form. More specifically, as shown in FIG. 2A, the digital image 205 can be separated or split into planar data sources for a red channel 210, green channel 215, and a blue channel 220. Such separation of the channels into the planar data sources 210, 215, 220 (using, e.g., planar converter module 115) allows for patterns to emerge such as redundancy or other recognizable sequences of digital image data as will be described in greater detail below. Such pattern exposure now allows for data compression modules 135 to more efficiently compress data to higher ratio levels.

Figure 2B:
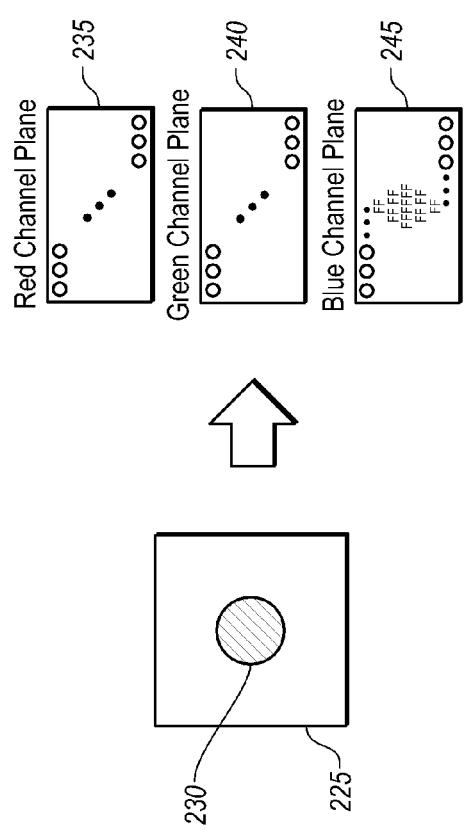
FIG. 2B illustrates a specific example of using planar data sources for enhanced compression in accordance with exemplary embodiments.

For example, as shown in FIG. 2B, a digital image 125 illustrates a blue shaded circle 130 on a black background (although it is appears in FIG. 2B as white for clarity purposes). Assuming additive color mixing in an RGB color space (i.e., white is absence or zeroing of all colors in the color space), the red and green channel planes 235, 240 would included all zeros. The blue channel plane 245 would also include zeros except for the area where the circle is illuminated, which in this case is fully illuminated as shown with hexadecimal number "FF". Accordingly, as will be recognized, each planar data source (i.e., red channel plane 235, green channel plane 240, and blue channel plane 245) can now be separately compressed using data compression modules 135.

In other words, by separating out the channel components into the various planes 235, 240, 245, patterns for each of them are more readily identifiable. For example, assuming a digital image 125 of approximately a thousand pixels (e.g., a 100×100 pixels) and using a simple RLE compressor, both the red 235 and green 240 channel planes may have a compression ratio of approximately 1,000:1. On the other hand, the blue channel plane 245 may only have a compression of say 100:1; however, the overall compression of the digital image 125 without separating the channels into the different planes may only be slightly greater than this value (if not worse). Accordingly, in this example, there is approximately a two-thirds better compression ratio by separating the channels into planar data sources 235, 240, 245 as opposed to leaving them in their interleaved form.

More specifically, by separating the interleaved bitmap 105 into a planar representation, each plane can be compressed independently and often times achieve higher compression ratios. This is especially true for channels that are expected to stay fairly constant throughout the digital image 105 most of the time. In other words, exemplary embodiments take advantage of the fact that often times one channel can be going through transitions while others are held fairly constant. For example, assume an Alpha channel was added to the RGB color space, which typically describes the transparency of a pixel. Often, the Alpha channel remains constant over the entire image, or only has a small number of pixels with different values for say a button or a small glyph. Accordingly, by using the above described embodiment of pre-processing, there is an approximate twenty-five percent increase in compression ratio than when the bitmap 105 is left in interleaved format. More specifically, because one out of the four channels (in this example the Alpha channel) can be highly compressed using only minimal bits relative to the number of bits for the entire channel, an automatic twenty-five percent compression savings is achieved.

Such high compression ratios can be extremely desirable in many instances. For example, as mentioned above for a virtual computing system in which full bitmaps 105 are sent to a remote client device rather than primitive operations, the use of the above and other embodiments as described herein can substantially reduce the bandwidth requirements to send such images 105. Note, however, that systems or mechanism other than virtual computing systems can also make use of such advantageous features. For example, memory consumption is always of great concern, especially as documents, images, and other files continuously increase in size. Accordingly, the above and other embodiments described herein can be utilized to compress photos and other image data that otherwise may not be as compressible in other formats. Of course, any instance in which high compression ratios are desirable may take advantage of features described herein. Accordingly, any particular environment for use of these embodiments as described herein is for illustrative purposes only and is not meant to limit or otherwise narrow the scope of such embodiments unless otherwise explicitly claimed.

Note that although exemplary embodiments provide for a planar converter module 115 in the pre-processing stage 110, other embodiments allow for the digital image 105 to be stored in planar format and retrieved on-the-fly to present to data compression modules 135 or otherwise processed in accordance with embodiments described in greater detail below. In fact, as mentioned above, the pre-processing 10 of the bitmap 105 may occur at some earlier time, the results compressed and stored, and the compressed image 105 sent to a remote or other device without having to decompress and recompress the image 105.

The utilization of the above embodiment can be further enhanced through converting the color space to another form and/or manipulating color channels. For example, as shown in FIG. 1, pre-processing stage 110 includes a color space converter module 120 which can be utilized to convert color spaces. More specifically, certain color spaces such as some with luminous and chrominance values are better suited for certain types of data compression modules 135. In other words, by converting an RGB space into a luminous, chrominance (e.g., YUV, YCoCg, YCbCr, etc.) and improvement in compression ratio may be achieved by almost a 2:1 increase. Of course, the type of enhancement in compression ratio may depended upon the type of data compression module 135 used, the current form of the digital image 105, or other various considerations. Further note that although the above conversion was from an RGB color space to a luminous, chrominance color space, other types of conversions are also contemplated here and may include any of the following or other types of well known color spaces: RGB, RGBA, CMYK (Cyan, Magnetic, Yellow, Key), CIE forms, YUV, YIQ, YDbDr, HLS, HSL (Hue, Saturation, Luminous), HSV (Hue, Saturation, Value), YCbCr, YPbPr, YCoCr, etc.

In addition to converting the image 105 from one color space to another, it may also be desirable to modify the image 105 or color space in order to achieve some acceptable loss when attempting to enhance the pattern recognition of a data compression module 135 as described herein. For instance, some luminance and chrominance color spaces (e.g., YCoCg) separate the channels into components based on eye sensitivity. In other words, the eye is considered to be more sensitive to changes in luminance (shown in FIG. 2D as 270) than the chrominance values (shown in pixel 265 as item $C_1$ and $C_2$ 275). Accordingly, by taking advantage of the perceptual differences of human eyes, it is possible to degrade the information within a color channel to enhance patterns that compression models can more efficiently handle, yet allowing the image to remain perceptually lossless.

As described herein, there may be several ways of allowing color information for a particular color space or digital image 105 to be modified in order to enhance compression ratios. For example, one embodiment uses image modification module 125 to allow for sub-sampling as illustrated using the four pixel representation 280 in FIG. 2D. In such sub-sampling embodiment, one or more color channel values (e.g., a chrominance value 275 $C_1$ and/or $C_2$) can be adjusted to match a similar chrominance value of the same type of channel within an adjacent pixel. For instance, if two adjacent pixels have a chrominance value 275 for say Co in the color space YCoCb that are only slightly different, such value may be normalized or otherwise changed to enhance pattern or redundancy recognition.

Figure 2D:
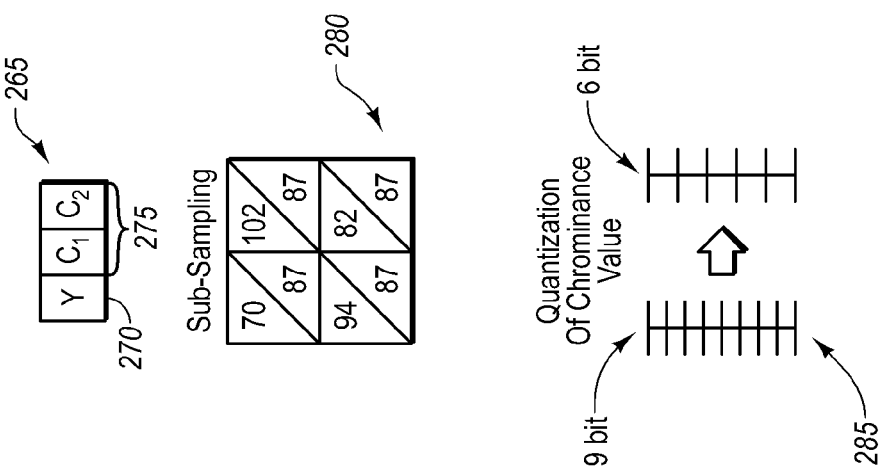
FIG. 2D illustrates additional techniques for manipulating data to enhance pattern recognition for more efficient compression in accordance with example embodiments.

By way of another example, consider the four pixels 280 shown in FIG. 2D. Each had an original value for a channel of a specific color space as shown in the top of each pixel (i.e., 70, 102, 94, and 82), but through sub-sampling each was changed to the lower corner number of 87, which is the average of all these values. As can be seen, this sub-sampling or modification of the image space would allow for these four pixels to be recognized now as a pattern when separating such channel value into the planar data sources. Note that this sub-sampling embodiment may use any number of well known algorithms for normalizing or otherwise converting channel values to enhance pattern recognition. For example, the average, mean, or other statistical value may be used, or the normalization may be based on other rules or data such as what types of changes will be less noticeable. Of course, there may be any number of ways to modify or normalize the channel values (even using a random value) as describe herein; and therefore the above examples are used herein for illustrative purposes only.

Of course, other image modification can be done using image modification module 125. For example, the quantization of chrominance or other channel values may be desirable. For example, as shown in FIG. 2D, one chrominance value may be represented using 9 bits as shown in the line grid 285. This nine bit representation, however, may require some additional processing and more than one byte to represent it. Accordingly, exemplary embodiments allow for a quantization value that will allow, e.g., the reducing the number of bits used to represent the same range of values. For example, if a quantization value is set to three, the nine bit representation in 285 may be reduced to a six bit representation as shown. Note that in such reduction, that the quantization of the chrominance or other channel component reduces the bit size and thus the color palette; however, the range of colors should remain constant. Also note that there may be other ways to modify bit values for a channel; and therefore the use of a particular mathematical manipulation or quantization value is used herein for illustrative purposes only and is not meant to limit or otherwise narrow the scope of embodiments described herein unless otherwise explicitly claimed.

There are other well known techniques for modifying chrominance and other channels within a color space for enhancing pattern recognition when pre-processing digital images 105 in accordance with exemplary embodiments. For example, control settings 130 can be used in setting conditions on sub-sampling and/or quantization for defining an acceptable level of color or other loss of data in accordance with exemplary embodiments. Further, there may be other control settings 130 that define the type of data compression modules 135 to be used and/or to set other desired preferences that may also be taken into consideration when converting or otherwise modifying a color as described herein. Accordingly, the above examples of sub-sampling and quantization are used herein for illustrative purposes only and are not meant to limit or otherwise narrow the scope of embodiments described herein unless otherwise explicitly claimed.

In any event, as previously mentioned, once the bitmap 105 has been logically split into separate planar bitmaps or planar data sources, the values can be encoded using, e.g., even simple encoding schemes such as a run length encoding (RLE). As such, each line of a bit map may be treated as a difference from the scan line that precedes it and those differences may be encoded as follows. For example, one embodiment allows for a control byte that contains a run length and a number of raw bytes that follow the control byte. The control byte may be logically split into two portions, one indicating the run length and another indicating a raw number of bytes that follow. In one embodiment, if the maximum value for either of these is exhausted with the need to have more, a new control byte may follow the raw bytes (if any) in the encoded stream.

Note that some embodiments recognize that it may not be worthwhile to encode a run with a length of less than three bytes; and thus the run length of values of one and two may be unused. Accordingly, these values may be advantageously used to indicate a longer run than could otherwise be encoded. For example, the following pseudo code shows how a control byte may be decoded and used to otherwise lengthen a run.

```
// ----
RawLength = ControlByte >> 4;
RunLength = ControlByte & 0x0f;
if (RunLength == 1)
{
   RunLength = 16 + RawLength;
   RawLength = 0;
}
else if (RunLength = 2)
{
   RunLength = 32 + RawLength;
   RawLength = 0;
}
// ----
```

Note that a run length of zero may be possible if there are only raw bytes of data. Of course, there are other forms of code and rules or run lengths that may be used to practice various embodiments described herein. In addition, and as described in greater detail below, there are other forms of compression (and even stages of compressors) that can advantageously benefit from embodiments described herein. Accordingly, the above pseudo code, definitions, and use of an RLE are used herein for illustrative purposes only and are not meant to limit or otherwise narrow the scope of embodiments described herein unless otherwise explicitly claimed.

Note that in the above examples when the interleaved channels were separated into the individual planar data sources, compression techniques took advantage of the redundancy of bits for achieving higher compression ratios. Nevertheless, it is worth noting that other patterns or recognizable sequences can also emerge through the above and other embodiments describe herein. For example, as shown in FIG. 2C, a gradient image 250 is provided where light colors of blue at the top of the image 250 gradually change to darker shades of blue at the bottom 250. When converted into planar form of a blue channel plane 255, this gradient image 250 may be represented from left to right (representing top to bottom of the image 250) as the color value as it gradually changes. Accordingly, such change produces a slope from "zero" to "FF" across the entire blue channel plane 255. Accordingly, various compressors may recognize such a pattern and more readily compress this pattern, which would otherwise not be easily recognizable when the other channels are interleaved with the blue channel.

Of course, using embodiments described herein to the other channels may expose other patterns that can be recognized by typical data compression modules 135. Moreover, it should be noted, that although a simple linear slope was identified for the gradient, when other images are used separating the channels into their respective planes may cause patterns of more sophisticated mathematical or digital sequences to emerge. For example, as shown in the random channel plane 260, the sinusoidal or other type of function of a channel may result depending on the image 105. Nevertheless, by separating the channels into planar form, and using other modification techniques as outlined below, even some of the more sophisticated images can be broken down into more manageable functions that a compressor 135 may recognize, which would otherwise not be identified. In fact, any number of patterns, bit sequences, or other forms of redundancy can emerge using embodiments described herein, which may be more readily compressed by any number of compression modules 135 than when the image is left in the interleaved form. Further note that these compression modules 135 can be pattern and/or static based.

Regardless of the type of data compression module 135 used to identify different patterns, redundancy, sequence, mathematical functions, etc., as previously mentioned, other embodiments allow for various stages of compression. For example, after performing the above planar separation and modification techniques described, a RLE compressor may be used to identify redundancy of the different channel or planar data sources. This compressed data may then be passed to another compressor that can identify other patterns or recognizable sequences. Accordingly, such process may be repetitively performed any number of times to achieve higher compression ratios. Of course, however, at some point there may be no further benefits and in fact at some point the further compression attempts may actually decrease the compression ratio. Nevertheless, embodiments described herein consider the use of any number of compression modules 135 including, but not limited to, RLE, MPEG based, JPEG, GIF, ZIP, LZ based, JBIG, DejaVu, etc.

In fact, note that only portions of the overall image 105 once separated and/or modified in planar form may be sent to different compression modules 135 for processing. For instance, only the Alpha channel may be passed to an RLE compressor 135 for processing, while the other channel components are passed to other compressors. Such mechanism may be advantageous when identifying what patterns or statistical sequences of data are best suited for a particular type of compression mechanism. As such, any number of compressors and any type may be used on different planar data sources as needed.

The present invention may also be described in terms of methods comprising functional steps and/or non-functional acts. The following is a description of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims only is used to indicate the desired specific use of such terms.

Figure 4:
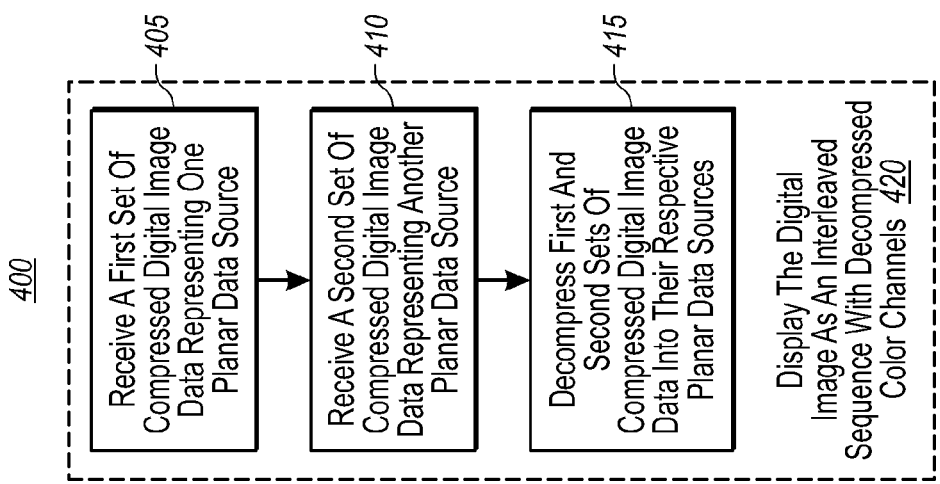
FIG. 4 illustrates a method of decompressing digital image data that was encoded as separate color channels of a color space in order to improve data compression in accordance with example embodiments.
Figure 3:
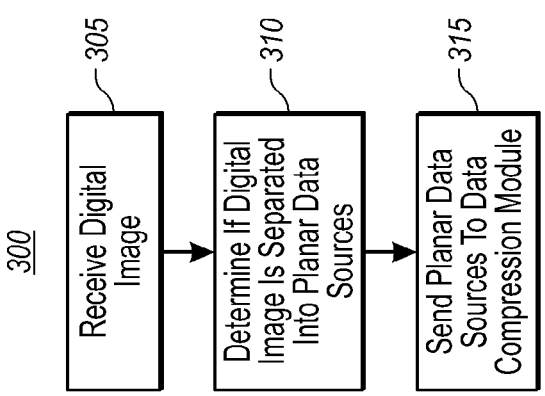
FIG. 3 illustrates a flow diagram for a method of pre-processing image data for improved data compression in accordance with example embodiments.

FIGS. 3 and 4 illustrate flow diagrams for various exemplary embodiments of the present invention. The following description of FIGS. 3 and 4 will occasionally refer to corresponding elements from FIGS. 1, 2A-D. Although reference may be made to a specific element from these Figures, such references are used for illustrative purposes only and are not meant to limit or otherwise narrow the scope of the described embodiments unless explicitly claimed.

FIG. 3 illustrates a flow diagram for a method 300 of pre-processing an image for improved data compression in accordance with example embodiments. As shown, method 300 includes an act of receiving 305 a digital image. For example, preprocessor stage 110 may receive digital image 105, which may be represented as a plurality of pixels wherein each pixel is defined by a first color space including color channels that are typically displayed such that the layout of the plurality of pixels appears as an interleaved sequence of the color channels. In other words, as shown in digital image 205, pixels may be interleaved with channels of a color space (e.g., as shown RGB). Note that in most instances the color spaces (e.g., RGB, RGBA, CMYK, CIELAB, CIELUV, CIE, YUV, YIQ, YDbDr, HLS, HSL, HIS, HSB, YCbCr, YPbPr, YCoCr, etc.) typically have three or more channel values. Embodiments herein, however, contemplate color spaces that may only have two or more channel values.

Method 200 also includes an act of determining 310 if a digital image is to be separated into planar data sources. More specifically, as mentioned above, digital image 105 may already be in a form that is separated into planar data sources (e.g., a red channel, green channel, blue channel 210, 215, 220). Each planar data source will include digital image data for each of the individual color channels such that redundancy or another recognizable sequence of digital image data can be readily identified by data compression modules 135 that are pattern based, static based, or both. Further, the compression modules 135 may be one or more of RLE, MPEG based, JPEG, GIF, ZIP, LZ based, JBIG, DejaVu, or other well known pattern or statistical based compression mechanism.

Based upon the above determination, method 300 also includes an act of sending 315 planar data sources to data compression modules. More specifically, pre-processing stage 110 can send the digital image 105 once it has determined it is in planar data source form to the data compression module(s) 135. Note that by separating the channels into the planar data sources, such separation assists the data compression modules 135 to more efficiently compress digital image 125 than when the digital image is in interleaved form.

Note that the planar data sources may be sent to multiple compression modules 135. For example, the planar data sources may be sent to a data compression module 135 for compressing large redundancies of digital data, and then sent to another compression module 135 for other pattern and/or statistical based processing. More specifically, the planar data sources may be passed to an RLE for a first compression mechanism that identifies large sequence patters, and then passed to another general purpose compressor for further data compression. As an example, the RGB color space with an Alpha channel allows the Alpha channel with a large amount of redundancy data to be passed to the RLE.

In the event that it is determined that the digital image is not separated into the planar data sources, the individual components for a first color channel and a second color channel may be identified and separated into their respective planar data source. Also note that other enhancements to the above embodiments are also available. For example, the color spaces may be converted from a second color space to the first color space, which has a better compression ratio than the second color space or can be used to further manipulate the digital image data for better pattern or statistical recognition. For instance, the color spaces may be converted from RGB based to one with luminance and chrominance channels. Further, the color space may be modified by identifying areas within the planar data sources where the image data can be altered for better pattern recognition. Based on control settings 130, and/or based on the type of compressor module 135 used, these identified areas may be by altering the original image data to achieve even better redundancy or other recognizable sequence or patterns than without the manipulation.

Such modification may include the sub-sampling such that a chrominance value for a color channel of a pixel is modified to match a chrominance value for another color channel of an adjacent pixel. Such modification may further be based on the average of the chrominance values, or some other statistical or other reasoning to normalize values. Alternatively, or in conjunction, the modification may include a quantization of chrominance (or other channel) components such that the bit size for the corresponding color channel is reduced a predetermined amount in order to reduce the amount of data needed to represent the chrominance (or other channel) component such that the reduction of the bit size reduces the color palette, but not the range of colors.

Note that the digital image may be in a virtual network computing environment such that the digital image 105 will be compressed for transmission to a remote device. In such embodiment, the digital image may be too complex to send to a remote device as a series of primitives and if left in its interleaved form the compression and transmission of the digital image to the remote device overly consumes transmission bandwidth.

FIG. 4 illustrates a method 400 of decompressing digital image data that was encoded as a separate color channel of a color space in accordance with example embodiments. Method 400 includes a step for displaying 420 the digital image as an interleaved sequence of decompressed color channels. Step for 420 includes an act of receiving 405 a first set of compressed digital image data representing one planar data source. For example, a remote device may receive a first set of compressed digital image data representing one of at least two planar data sources (e.g., red channel planar data source 210), wherein each of the at least two planar data sources corresponds to a color channel of a first color space for a plurality of pixels 205 of a digital image 105. Each of the two planar data sources are exposed as separate digital image data such that the redundancy or any other recognizable sequence of digital image data could readily be identified by data compression modules 135 that are pattern based, static based, or both.

Thereafter step for 420 includes an act of receiving 410 a second set of compressed digital image data representing another planar data source. In other words, a remote device may also receive a planar data source of and green channel planar data source 215 that is compressed in accordance with exemplary embodiments described herein. Thereafter, step for 420 includes and act of decompressing 415 the first and second set of compressed digital image data into their respective planar data sources. Once decompressed, the planar data sources can be properly interleaved back to the digital image 105 and appropriately displayed such that each pixel 205 of the digital image includes a color component corresponding to each of the at least two planar data sources. Note that other embodiments previously described regarding the pre-processing of image data may also correspond to the decompression embodiment herein described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a digital image computing device, a method of pre-processing an image for improved data compression by exposing one or more common patterns in the image data that are typically unrecognizable by a bit stream processor when the image data is displayed in color channel interleaved form, the method comprising:
  receiving a digital image represented as a plurality of pixels, wherein each pixel is defined by a first color space including at least two color channels that are typically displayed such that the layout of the plurality of pixels appears as an interleaved sequence of the at least two color channels;
  separating the digital image into a planar data source for each of the at least two color channels by splitting each color component of each pixel into the planar data source for the corresponding color channel;
  sub-sampling a particular planar data source by:
    selecting a subset of the color components in the particular planar data source;
    averaging the values from each of the color components in the selected subset;
    assigning the average value to each of the color components of the selected subset to create a recognizable pattern for compression among the selected subset of color components in the particular data source; and
    assigning the average value to each of the color components of the selected subset including individually storing the average value for each of the color components of the selected subset prior to compression;
  sending the at least two planar data sources to the one or more data compression modules where each planar data source is separately compressed in order to more efficiently compress the digital image than when the digital image is in its interleaved form; and
  one or more of:
    converting a second color space to the first color space, the second color space having color channels of luminance and at least one chrominance component;
    identifying one or more areas within the at least two planar data sources where the image data can be altered for better pattern recognition; and
    based on one or more control settings, or based on the type of compressor used, modifying the areas by altering original image data to achieve even better redundancy or other recognizable sequences or patterns than without the manipulation, the modifying including sub-sampling such that at least a chrominance value for one color channel of a pixel is modified to match a chrominance value for another color channel of an adjacent pixel.

2. The method of claim 1, wherein the digital image is in a virtual network computing environment and the digital image is compressed for transmitting to a remote device, and wherein the digital image is too complex to send to the remote device as a series of graphic primitives, and wherein if left in its interleaved form the compression and transmission of the digital image to the remote device overly consumes transmission bandwidth.

3. The method of claim 1, wherein the one or more data compression modules includes one or more of RLE, MPEG based, JPEG, GIF, ZIP, LZ based, JBIG, DejaVu, or other well known pattern or statistical based compression mechanism.

4. The method of claim 1, wherein the at least two planar data sources are sent to a first data compression module for compressing large redundancies of digital data and then sent to a second data compression module for other pattern, statistical, or arithmetic based processing.

5. The method of claim 1, wherein the first color space is one of RGB, RGBA, CMYK, CIELAB, CIELUV, CIE, YUV, YIQ, YDbDr, HLS, HSL, HIS, HSB, YCbCr, YPbPr, and YCoCr.

6. The method of claim 1, wherein the first color space is RGB based.

7. The method of claim 1, wherein the modification is based on an average of the chrominance values.

8. The method of claim 1, wherein the modification includes a quantization of the at least one chrominance component such that the bit size for the corresponding color channel is reduced a predetermined amount in order to reduce the amount of data needed to represent the at least one chrominance component, and wherein the reduction of the bit size reduces the color palette, but not the range of colors.

9. The method of claim 1, wherein at least one of the at least two planar data sources is passed to an RLE for a first compression mechanism that identifies large sequence patterns, and wherein the at least two planar data sources are passed to another general purpose compressor for further data compression.

10. The method of claim 9, wherein the first color space is an RGB color space with an Alpha channel, and wherein the Alpha channel comprises a large amount of redundancy data, which is passed to the RLE.

11. The method of claim 1 further comprising:
  transmitting the compressed at least two planar data sources to a receiving computer;
  receiving, at the receiving computer, the at least two compressed planar data sources;
  decompressing the at least two compressed planar data sources into their respective planar data sources; and
  displaying the digital image as an interleaved sequence of the decompressed color channels such that each pixel of the digital image includes a color component corresponding to each of the at least two planar data sources.

12. In a digital image computing device, a computer program product for implementing a method of pre-processing an image for improved data compression by exposing one or more common patterns in the image data that are typically unrecognizable by a bit stream processor when the image data is displayed in color channel interleaved form, the computer program product comprising one or more computer-readable media having stored thereon computer-executable instructions that, when executed by one or more processors of the digital image computing device, cause the digital image computing device to perform the following:
  receive a digital image represented as a plurality of pixels, wherein each pixel is defined by a first color space including at least two color channels that are typically displayed such that the layout of the plurality of pixels appears as an interleaved sequence of the at least two color channels;
  separate the digital image into a planar data source for each of the at least two color channels by splitting each color component of each pixel into the planar data source for the corresponding color channel;
  sub-sample a particular planar data source by:
    selecting a subset of the color components in the particular planar data source;
    averaging the values from each of the color components in the selected subset;
    assigning the average value to each of the color components of the selected subset to create a recognizable pattern for compression among the selected subset of color components in the particular data source; and assigning the average value to each of the color components of the selected subset including individually storing the average value for each of the color components of the selected subset prior to compression;

send the at least two planar data sources to the one or more data compression modules where each planar data source is separately compressed in order to more efficiently compress the digital image than when the digital image is in its interleaved form; and one or more of:

convert a second color space to the first color space, the second color space having color channels of luminance and at least one chrominance component;

identifying one or more areas within the at least two planar data sources where the image data can be altered for better pattern recognition; and based on one or more control settings, or based on the type of compressor used, modifying the areas by altering original image data to achieve even better redundancy or other recognizable sequences or patterns than without the manipulation, wherein the modification includes sub-sampling such that at least a chrominance value for one color channel of a pixel is modified to match a chrominance value for another color channel of an adjacent pixel.

* * * * *